United States Patent
Gao et al.

(10) Patent No.: US 9,635,587 B2
(45) Date of Patent: Apr. 25, 2017

(54) MULTI-STANDARD NETWORK CONVERGENCE METHOD, DEVICE, AND SYSTEM

(71) Applicant: Huawei Technologies Co., Ltd., Shenzhen (CN)

(72) Inventors: Lei Gao, Moscow (RU); Linfeng Xia, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 14/812,931

(22) Filed: Jul. 29, 2015

(65) Prior Publication Data

US 2015/0334601 A1    Nov. 19, 2015

Related U.S. Application Data

(63) Continuation of application No. PCT/CN2013/083257, filed on Sep. 11, 2013.

(30) Foreign Application Priority Data

Jan. 31, 2013   (CN) .......................... 2013 1 0039115

(51) Int. Cl.
  *H04W 28/18*    (2009.01)
  *H04W 28/02*    (2009.01)
  (Continued)

(52) U.S. Cl.
  CPC ......... *H04W 28/18* (2013.01); *H04L 47/2491* (2013.01); *H04W 28/02* (2013.01);
  (Continued)

(58) Field of Classification Search
  None
  See application file for complete search history.

(56) References Cited

U.S. PATENT DOCUMENTS

2005/0135416 A1 *  6/2005  Ketchum ......... H04L 25/03343
                                                   370/469
2005/0185651 A1 *  8/2005  Rinne .................... H04L 47/10
                                                   370/395.1
(Continued)

FOREIGN PATENT DOCUMENTS

CN     101960799 A    1/2011
CN     102138313 A    7/2011
(Continued)

OTHER PUBLICATIONS

"Part 11: Wireless LAN Medium Access Control (MAC) and Physical Layer (PHY) Specifications, Amendment 8: Medium Access Control (MAC) Quality of Service Enhancements," IEEE Standard for Information Technology—Telecommunications and Information Exchange Between Systems—Local and Metropolitan Area Networks—Specific Requirements, IEEE Computer Society, Nov. 11, 2005, 211 pages.

(Continued)

*Primary Examiner* — Gary Mui
(74) *Attorney, Agent, or Firm* — Slater Matsil, LLP

(57) ABSTRACT

The present invention discloses a multi-standard network convergence method, device, and system and relates to the field of communications technologies. The method includes: acquiring an AC mapping parameter corresponding to an RLC packet; performing encapsulation on the AC mapping parameter and the RLC packet; and forwarding an encapsulated packet to a second network, so that the second network acquires a corresponding AC according to the AC mapping parameter in the encapsulated packet, and places the RLC packet into a transmission queue corresponding to the AC for transmission. According to the present invention, an AC mapping parameter and an RLC packet are encapsulated and then sent to a second network, so that the second network may determine a corresponding AC according to the AC mapping parameter, so as to accurately place the (Continued)

RLC packet into a corresponding transmission queue for transmission and further implement multi-standard network convergence.

18 Claims, 5 Drawing Sheets

(51) Int. Cl.
    *H04L 12/857*     (2013.01)
    *H04W 88/06*     (2009.01)
    *H04W 28/06*     (2009.01)

(52) U.S. Cl.
    CPC ........ *H04W 28/0268* (2013.01); *H04W 28/06* (2013.01); *H04W 88/06* (2013.01)

(56) References Cited

U.S. PATENT DOCUMENTS

| | | | |
|---|---|---|---|
| 2008/0031253 A1* | 2/2008 | Kim | H04L 1/0045 370/393 |
| 2009/0086710 A1* | 4/2009 | Ho | H04W 28/06 370/349 |
| 2009/0213858 A1 | 8/2009 | Dolganow et al. | |
| 2009/0219930 A1 | 9/2009 | Dolganow et al. | |
| 2010/0054257 A1 | 3/2010 | Dolganow et al. | |
| 2014/0321288 A1* | 10/2014 | Ha | H04W 28/0268 370/237 |

FOREIGN PATENT DOCUMENTS

| | | |
|---|---|---|
| CN | 102573005 A | 7/2012 |
| WO | 2010128009 A1 | 11/2010 |
| WO | 2012078976 A1 | 6/2012 |
| WO | 2012148482 A1 | 11/2012 |

OTHER PUBLICATIONS

"Bringing QoS Over Wireless LAN into Focus," Aruba Networks, Aruba White Paper, 2011, 14 pages.

* cited by examiner

MULTI-STANDARD NETWORK CONVERGENCE METHOD, DEVICE, AND SYSTEM

This application is a continuation of International Application No. PCT/CN2013/083257, filed on Sep. 11, 2013, which claims priority to Chinese Patent Application No. 201310039115.7, filed on Jan. 31, 2013, both of which are hereby incorporated by reference in their entireties.

TECHNICAL FIELD

The present invention relates to the field of communications technologies, and in particular, to a multi-standard network convergence method, device, and system.

BACKGROUND

With popularization of intelligent terminals, a requirement of people for a wireless communications service increases significantly. In particular, a sharp increase in a requirement for data communications causes increasing data load borne by a cellular network. For a WLAN (Wireless Local Area Network, wireless local area network), networking is relatively simple, a cost is relatively low, and an industry chain is mature; therefore, the WLAN may serve as a supplementary to the cellular network so as to effectively share load of some data services of the cellular network and lighten load on the cellular network. Therefore, implementation of multi-standard network convergence between a cellular system and a WLAN network becomes a preferable method for network expansion and networking by a large number of cellular operators.

Currently, for an LTE (Long Term Evolution, Long Term Evolution) network in a cellular network and a WiFi (Wireless Fidelity, Wireless Fidelity) technology in a WLAN, Intel (Intel) and Vodafone (Vodafone) propose an LTE-WiFi CA (Carrier Aggregation, carrier aggregation) solution in the 3GPP (3rd Generation Partnership Project, 3rd Generation Partnership Project) standard. On a premise that a core network and an 802.11 air interface remain unchanged, in the solution, LTE is used as a primary access system at an RLC (Radio Link Control, Radio Link Control) layer to provide functions, such as mobility management, security management, and status management, and WiFi is used as a secondary system to provide only a user-plane transmission function.

In a process of implementing the present invention, the inventors find that the prior art has at least the following disadvantages:

The LTE-WiFi CA solution proposes merely an architecture of implementing multi-standard network convergence, but provides no solution to specific implementation of this architecture. In addition, during implementation of data offloading at an RLC layer by using an existing technology, after a packet is received on a WiFi side, a queue into which the packet is placed for transmission cannot be learned, so that multi-standard network convergence cannot be implemented in a real sense.

SUMMARY

To solve a problem in the prior art, embodiments of the present invention provide a multi-standard network convergence method, device, and system. The technical solutions are as follows:

According to a first aspect, a multi-standard network convergence method is provided, where the method includes:

acquiring a Radio Link Control RLC packet, and acquiring an access category AC mapping parameter corresponding to the RLC packet;

performing encapsulation on the AC mapping parameter and the RLC packet to form an encapsulated packet; and forwarding the encapsulated packet to a second network, so that the second network acquires a corresponding AC according to the AC mapping parameter in the encapsulated packet, and places the RLC packet into a transmission queue corresponding to the AC for transmission.

With reference to the first aspect, in a first possible implementation manner of the first aspect, the acquiring an access category AC mapping parameter corresponding to the RLC packet to form an encapsulated packet includes:

parsing a differentiated services code point DSCP of the RLC packet by using a deep packet inspection DPI technology, and using the DSCP as the acquired AC mapping parameter; and the performing encapsulation on the AC mapping parameter and the RLC packet includes:

replicating the DSCP to an Internet Protocol IP tunnel header, and performing encapsulation on the IP tunnel header and the RLC packet to form the encapsulated packet, where the IP tunnel header further includes an IP source address and an IP destination address of the RLC packet.

With reference to the first aspect, in a second possible implementation manner of the first aspect, the acquiring an access category AC mapping parameter corresponding to the RLC packet includes:

acquiring a QoS class identifier QCI of the RLC packet from a Packet Data Convergence Protocol PDCP layer, and using the QCI as the acquired AC mapping parameter; and the performing encapsulation on the AC mapping parameter and the RLC packet to form an encapsulated packet includes:

adding the QCI into a first customized packet header, and performing encapsulation on the first customized packet header and the RLC packet to form the encapsulated packet.

With reference to the first aspect, in a third possible implementation manner of the first aspect, the acquiring an access category AC mapping parameter corresponding to the RLC packet includes:

acquiring a QoS class identifier QCI of the RLC packet from a Packet Data Convergence Protocol PDCP layer, mapping the QCI to an AC, and using an AC index as the acquired AC mapping parameter, where the AC index corresponds to the AC and is obtained after the mapping; and the performing encapsulation on the AC mapping parameter and the RLC packet to form an encapsulated packet includes:

adding the AC index into a second customized packet header, and performing encapsulation on the second customized packet header and the RLC packet to form the encapsulated packet.

According to a second aspect, a network device is provided, where the network device includes:

a first acquiring module, configured to acquire a Radio Link Control RLC packet;

a second acquiring module, configured to acquire an access category AC mapping parameter corresponding to the RLC packet acquired by the first acquiring module;

an encapsulating module, configured to perform encapsulation on the AC mapping parameter acquired by the second acquiring module and the RLC packet acquired by the first acquiring module, to form an encapsulated packet; and a forwarding module, configured to: forward the encapsulated packet obtained by the encapsulating module to a second network, so that the second network acquires a corresponding AC according to the AC mapping parameter in the encapsulated packet, and places the RLC packet into a transmission queue corresponding to the AC for transmission.

With reference to the second aspect, in a first possible implementation manner of the second aspect, the second acquiring module is configured to: parse a differentiated services code point DSCP of the RLC packet by using a deep packet inspection DPI technology, and use the DSCP as the acquired AC mapping parameter; and the encapsulating module is configured to: replicate the DSCP acquired by the second acquiring module to an Internet Protocol IP tunnel header, and perform encapsulation on the IP tunnel header and the RLC packet to form the encapsulated packet, where the IP tunnel header further includes an IP source address and an IP destination address of the RLC packet.

With reference to the second aspect, in a second possible implementation manner of the second aspect, the second acquiring module is configured to: acquire a QoS class identifier QCI of the RLC packet from a Packet Data Convergence Protocol PDCP layer, and use the QCI as the acquired AC mapping parameter; and the encapsulating module is configured to: add the QCI acquired by the second acquiring module into a first customized packet header, and perform encapsulation on the first customized packet header and the RLC packet to form the encapsulated packet.

With reference to the second aspect, in a third possible implementation manner of the second aspect, the second acquiring module is configured to: acquire a QoS class identifier QCI of the RLC packet from a Packet Data Convergence Protocol PDCP layer, map the QCI to an AC, and use an AC index as the acquired AC mapping parameter, where the AC index corresponds to the AC and is obtained after the mapping; and the encapsulating module is configured to: add the AC index acquired by the second acquiring module into a second customized packet header, and perform encapsulation on the second customized packet header and the RLC packet to form the encapsulated packet.

According to a third aspect, a multi-standard network convergence method is provided, where the method includes:

receiving an encapsulated packet forwarded by a first network, where the encapsulated packet includes an access category AC mapping parameter and a Radio Link Control RLC packet;

acquiring the AC mapping parameter in the encapsulated packet, and acquiring an AC corresponding to the AC mapping parameter; and placing the RLC packet into a transmission queue corresponding to the AC for transmission.

With reference to the third aspect, in a first possible implementation manner of the third aspect, the AC mapping parameter corresponding to the RLC packet is a differentiated services code point DSCP of the RLC packet;

the acquiring the AC mapping parameter in the encapsulated packet includes:

performing decapsulation on the encapsulated packet to obtain the RLC packet and an IP tunnel header that includes the DSCP of the RLC packet, and parsing the IP tunnel header to obtain the DSCP of the RLC packet; and the acquiring an AC corresponding to the AC mapping parameter includes:

determining a corresponding QoS class according to the DSCP, acquiring, according to a pre-established mapping relationship between a QoS class and an AC, an AC corresponding to the determined QoS class, and using the determined AC as an AC corresponding to the DSCP.

With reference to the third aspect, in a second possible implementation manner of the third aspect, the AC mapping parameter corresponding to the RLC packet is a QoS class identifier QCI of the RLC packet;

the acquiring the AC mapping parameter in the encapsulated packet includes:

performing decapsulation on the encapsulated packet to obtain the RLC packet and a first customized packet header that includes the QCI of the RLC packet, and parsing the first customized packet header to obtain the QCI of the RLC packet; and the acquiring an AC corresponding to the AC mapping parameter includes:

determining a corresponding QoS class according to the QCI, acquiring, according to a pre-established mapping relationship between a QoS class and an AC, an AC corresponding to the determined QoS class, and using the determined AC as an AC corresponding to the QCI.

With reference to the third aspect, in a third possible implementation manner of the third aspect, the AC mapping parameter corresponding to the RLC packet is an AC index;

the acquiring the AC mapping parameter in the encapsulated packet includes:

performing decapsulation on the encapsulated packet to obtain the RLC packet and a second customized packet header that includes the AC index, and parsing the second customized packet header to obtain the AC index; and the acquiring an AC corresponding to the AC mapping parameter includes:

acquiring an AC corresponding to the AC index.

According to a fourth aspect, a network device is provided, where the device includes:

a receiving module, configured to receive an encapsulated packet forwarded by a first network, where the encapsulated packet includes an access category AC mapping parameter and a Radio Link Control RLC packet;

a third acquiring module, configured to acquire the AC mapping parameter in the encapsulated packet received by the receiving module;

a fourth acquiring module, configured to acquire an AC corresponding to the AC mapping parameter acquired by the third acquiring module; and a transmission module, configured to place the RLC packet into a transmission queue corresponding to the AC for transmission, where the AC is acquired by the fourth acquiring module.

With reference to the fourth aspect, in a first possible implementation manner of the fourth aspect, the AC mapping parameter corresponding to the RLC packet is a differentiated services code point DSCP of the RLC packet;

the third acquiring module is configured to: perform decapsulation on the encapsulated packet to obtain the RLC packet and an IP tunnel header that includes the DSCP of the RLC packet, and parse the IP tunnel header to obtain the DSCP of the RLC packet; and the fourth acquiring module is configured to: determine a corresponding QoS class according to the DSCP, acquire, according to a pre-established mapping relationship between a QoS class and an AC, an AC corresponding to the determined QoS class, and use the determined AC as an AC corresponding to the DSCP.

With reference to the fourth aspect, in a second possible implementation manner of the fourth aspect, the AC mapping parameter corresponding to the RLC packet is a QoS class identifier QCI of the RLC packet;

the third acquiring module is configured to: perform decapsulation on the encapsulated packet to obtain the RLC packet and a first customized packet header that includes the QCI of the RLC packet, and parse the first customized packet header to obtain the QCI of the RLC packet; and the fourth acquiring module is configured to: determine a corresponding QoS class according to the QCI, acquire, according to a pre-established mapping relationship between a QoS class and an AC, an AC corresponding to the determined QoS class, and use the determined AC as an AC corresponding to the QCI.

With reference to the fourth aspect, in a third possible implementation manner of the fourth aspect, the AC mapping parameter corresponding to the RLC packet is an AC index;

the third acquiring module is configured to: perform decapsulation on the encapsulated packet to obtain the RLC packet and a second customized packet header that includes the AC index, and parse the second customized packet header to obtain the AC index; and the fourth acquiring module is configured to acquire an AC corresponding to the AC index.

According to a fifth aspect, a multi-standard network convergence system is provided, where the system includes: a first network device and a second network device, where the first network device is the network device according to the second aspect, and the second network device is the network device according to the fourth aspect.

The technical solutions provided in the embodiments of the present invention bring the following beneficial effects:

An AC mapping parameter and an RLC packet are encapsulated and then sent to a second network, so that the second network may determine a corresponding AC according to the AC mapping parameter, so as to accurately place the RLC packet into a corresponding transmission queue for transmission and further implement multi-standard network convergence.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following describes the embodiments of the present invention in further detail with reference to the accompanying drawings.

Embodiment 1

Figure 1:
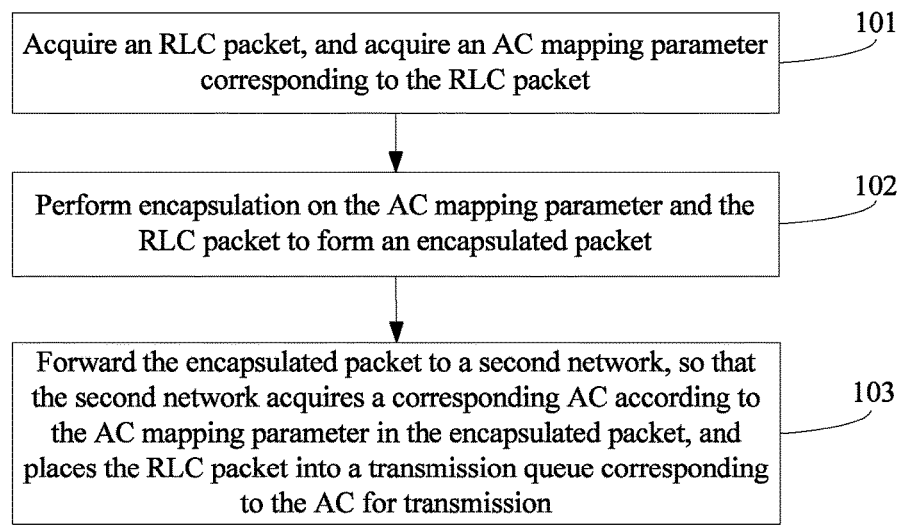
FIG. 1 is a flowchart of a multi-standard network convergence method according to Embodiment 1 of the present invention.

This embodiment provides a multi-standard network convergence method. Referring to FIG. 1, a procedure of the method provided in this embodiment is specifically as follows:

101. Acquire an RLC (Radio Link Control, Radio Link Control) packet, and acquire an AC (Access Category, access category) mapping parameter corresponding to the RLC packet.

102. Perform encapsulation on the AC mapping parameter and the RLC packet to form an encapsulated packet.

103. Forward the encapsulated packet to a second network, so that the second network acquires a corresponding AC according to the AC mapping parameter in the encapsulated packet, and places the RLC packet into a transmission queue corresponding to the AC for transmission.

Figure 2:
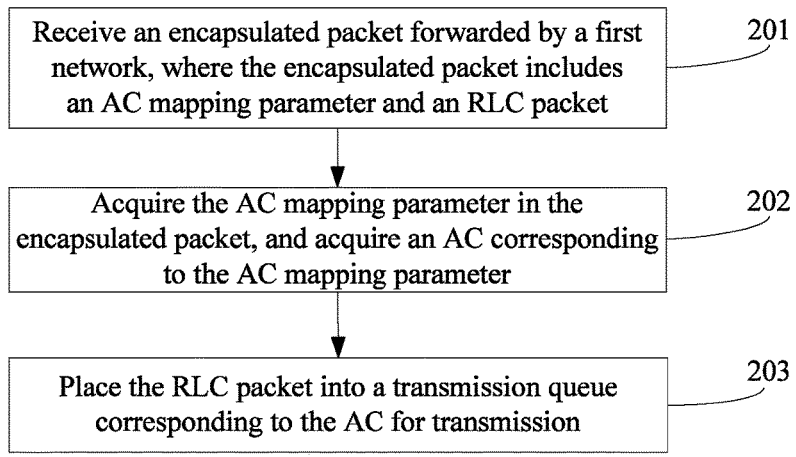
FIG. 2 is a flowchart of another multi-standard network convergence method according to Embodiment 1 of the present invention.

This embodiment further provides another multi-standard network convergence method. Referring to FIG. 2, the method provided in this embodiment is specifically as follows:

201. Receive an encapsulated packet forwarded by a first network, where the encapsulated packet includes an AC mapping parameter and an RLC packet.

202. Acquire the AC mapping parameter in the encapsulated packet, and acquire an AC corresponding to the AC mapping parameter.

203. Place the RLC packet into a transmission queue corresponding to the AC for transmission.

According to the method provided in this embodiment, an AC mapping parameter and an RLC packet are encapsulated and then sent to a second network, so that the second network may determine a corresponding AC according to the AC mapping parameter, so as to accurately place the RLC packet into a corresponding transmission queue for transmission and further implement multi-standard network convergence.

To describe the multi-standard network convergence method provided in the foregoing embodiment more clearly, the multi-standard network convergence method is described in detail with reference to content of the foregoing embodiment and by using the following Embodiment 2 to Embodiment 4 as an example. For details, refer to the following Embodiment 2 to Embodiment 4.

Embodiment 2

Figure 3:
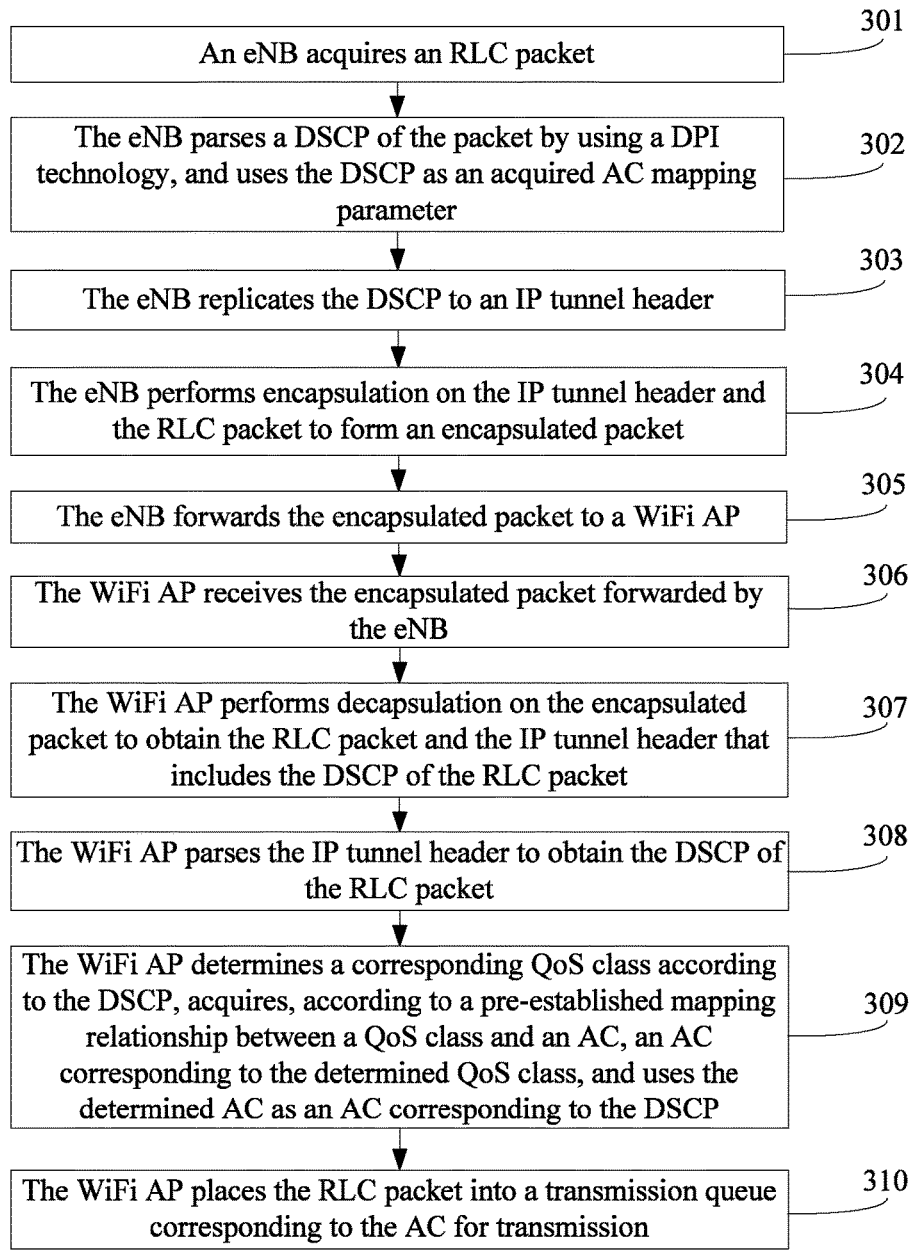
FIG. 3 is a flowchart of a multi-standard network convergence method according to Embodiment 2 of the present invention.

This embodiment provides a multi-standard network convergence method. For ease of description, in this embodiment, the method provided in this embodiment is described in detail by using an example in which a first network is an LTE (Long Term Evolution, Long Term Evolution) network, a first network device is an eNB (evolved NodeB, evolved NodeB), a second network is a WLAN (Wireless Local Area Network, wireless local area network), a second network device is a WiFi AP (Wireless Fidelity Access Point, wireless compatibility certification access point), and the eNB acquires an RLC packet and sends the RLC packet to the WiFi AP. Referring to FIG. 3, a procedure of the method provided in this embodiment is specifically as follows:

301. The eNB acquires an RLC packet.

For this step, this embodiment imposes no specific limitation on a manner for acquiring the RLC packet, for example, RLC packets may be acquired in batches, or all RLC packets may be acquired at a time.

Figure 4:
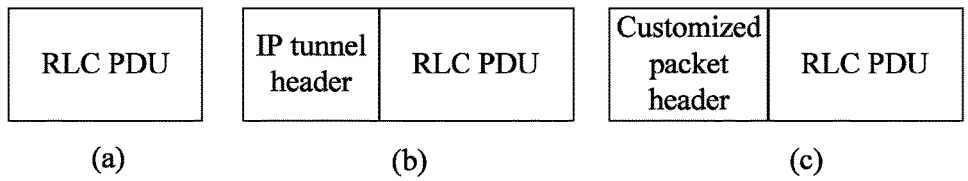
FIG. 4 is a schematic diagram of a format of a packet according to Embodiment 2 of the present invention.

Specifically, the eNB acquires the RLC packets in batches, or the eNB acquires all the RLC packets at a time, where a format of the RLC packets is shown in FIG. 4 (a).

302. The eNB parses a DSCP (Differentiated Services Code Point, differentiated services code point) of the packet by using a DPI (Deep Packet Inspection, deep packet inspection) technology, and uses the DSCP as an acquired AC mapping parameter.

This embodiment imposes no specific limitation on a manner for parsing the DSCP of the packet by using the DPI technology, which includes but is not limited to performing decapsulation on the packet to obtain the DSCP of the packet by means of decoding.

In addition, because the DSCP may reflect a QoS (Quality of Service, quality of service) class, which is identified at an IP (Internet Protocol, Internet Protocol) layer, of the RLC packet, and the QoS class has a mapping relationship with an AC, the AC may be learned according to the DSCP. Therefore, the DSCP is used as the acquired AC mapping parameter.

Specifically, the eNB performs decapsulation on the packet by using the DPI technology to obtain the DSCP of the packet by means of decoding; or certainly, may parse the DSCP of the packet by using another method, and use the DSCP as the acquired AC mapping parameter.

303. The eNB replicates the DSCP to an IP tunnel header.

For this step, the embodiment imposes no specific limitation on a manner for replicating the DSCP to the IP tunnel header, for example, the replicated DSCP and the IP tunnel header may be coded, so as to add the replicated DSCP into the IP tunnel header. This embodiment also imposes no specific limitation on content of the IP tunnel header. The IP tunnel header may include but is not limited to an IP source address and an IP destination address of the RLC packet.

Specifically, the eNB replicates the DSCP obtained by means of decapsulation, and codes the replicated DSCP and the IP tunnel header, so as to replicate the DSCP to the IP tunnel header.

304. The eNB performs encapsulation on the IP tunnel header and the RLC packet to form an encapsulated packet.

This embodiment imposes no specific limitation on a manner for performing encapsulation on the IP tunnel header and the RLC packet, which includes but is not limited to coding the IP tunnel header and the RLC packet to form the encapsulated packet.

Specifically, the eNB codes the IP tunnel header obtained in step 303 and the acquired RLC packet to form the encapsulated packet, where a format is shown in FIG. 4 (b).

305. The eNB forwards the encapsulated packet to the WiFi AP.

For this step, this embodiment imposes no specific limitation on a manner for forwarding the encapsulated packet to the WiFi AP, for example, encapsulated packets may be forwarded in batches to the WiFi AP, or all encapsulated packets may be forwarded to the WiFi AP at a time.

Specifically, the eNB forwards the encapsulated packets to the WiFi AP in batches, or forwards all the encapsulated packets to the WiFi AP at a time.

306. The WiFi AP receives the encapsulated packet forwarded by the eNB, where the encapsulated packet includes the AC mapping parameter and the RLC packet.

For this step, this embodiment imposes no specific limitation on a manner for receiving the encapsulated packet forwarded by the eNB, for example, encapsulated packets forwarded by the eNB may be received in batches, or all encapsulated packets forwarded by the eNB may be received at a time.

Specifically, the WiFi AP receives, in batches, the encapsulated packets forwarded by the eNB, or the WiFi AP receives, at a time, all the encapsulated packets forwarded by the eNB, where a format of the encapsulated packets is shown in FIG. 4 (b).

307. The WiFi AP performs decapsulation on the encapsulated packet to obtain the RLC packet and the IP tunnel header that includes the DSCP of the RLC packet.

For this step, this embodiment imposes no specific limitation on a method for performing decapsulation on the encapsulated packet, which includes but is not limited to decoding the encapsulated packet.

Specifically, the WiFi AP decodes the received encapsulated packet to obtain the RLC packet and the IP tunnel header that includes the DSCP of the RLC packet.

308. The WiFi AP parses the IP tunnel header to obtain the DSCP of the RLC packet.

For this step, this embodiment imposes no specific limitation on a method for parsing the IP tunnel header, which includes but is not limited to decoding the IP tunnel header.

Specifically, the WiFi AP decodes the IP tunnel header to obtain the DSCP of the RLC packet.

309. The WiFi AP determines a corresponding QoS class according to the DSCP, acquires, according to a pre-established mapping relationship between a QoS class and an AC, an AC corresponding to the determined QoS class, and uses the determined AC as an AC corresponding to the DSCP.

Because the DSCP reflects the QoS class, which is identified at the IP layer, of the RLC packet, the corresponding QoS class may be determined according to the DSCP. This embodiment imposes no specific limitation on a manner for determining the corresponding QoS class according to the DSCP, which includes but is not limited to acquiring the corresponding QoS class by using a table of a correspondence between a DSCP and a QoS class. Alternatively, the corresponding QoS class may be acquired in another manner.

This embodiment imposes no specific limitation on a method for acquiring the AC corresponding to the determined QoS class, for example, the AC is acquired by using a table of a correspondence between a QoS class and an AC. Alternatively, the AC may be acquired in another manner.

Specifically, the WiFi AP determines the corresponding QoS class according to the obtained DSCP, and uses the AC that is corresponding to the QoS class and determined according to a table of a correspondence between a DSCP and an AC as the AC corresponding to the DSCP.

For example, a table of a correspondence between a DSCP, a QoS class, and an AC is shown in Table 1.

TABLE 1

| DSCP | QoS class | AC |
|------|-----------|-----|
| 56-63 | 7 | Voice |
| 48-55 | 6 | Voice |
| 40-47 | 5 | Video |
| 32-39 | 4 | Video |
| 24-31 | 3 | Best-effort |
| 16-23 | 0 | Best-effort |
| 8-15 | 2 | Back-ground |
| 0-7 | 1 | Back-ground |

Voice (Voice), Video (Video), Best-effort (Best-effort), and Back-ground (Back-ground) in the foregoing Table 1 are specifically ACs. In addition to the foregoing categories, another AC may further be included. This embodiment imposes no limitation on a specific AC. If a value of the DSCP that is obtained by the WiFi AP is 55, it is determined, according to a correspondence between a DSCP and a QoS class in Table 1, that the QoS class corresponding to the DSCP is 6, it is then determined, according to a correspondence between a QoS class and an AC in Table 1, that an AC corresponding to QoS whose class is 6 is Voice, and the determined Voice is used as the AC corresponding to the DSCP. Certainly, a value of the DSCP may be 45, 35, or another value, and a value of the DSCP is not specifically limited herein.

310. The WiFi AP places the RLC packet into a transmission queue corresponding to the AC for transmission.

Specifically, if it is determined in step 309 that the AC of the RLC packet is Voice, the RLC packet is placed into a Voice queue corresponding to the AC for transmission. Certainly, if it is determined in step 309 that the AC of the RLC packet is Video, the RLC packet is placed into a Video queue corresponding to the AC for transmission. A format of the RLC packet uses the FIG. 4 (*a*) as an example.

According to the method provided in this embodiment, a DSCP used as an AC mapping parameter, and an RLC packet are encapsulated and then sent to a second network, so that the second network may determine a corresponding AC according to the DSCP, so as to accurately place the RLC packet into a corresponding transmission queue for transmission and further implement multi-standard network convergence.

Embodiment 3

Figure 5:
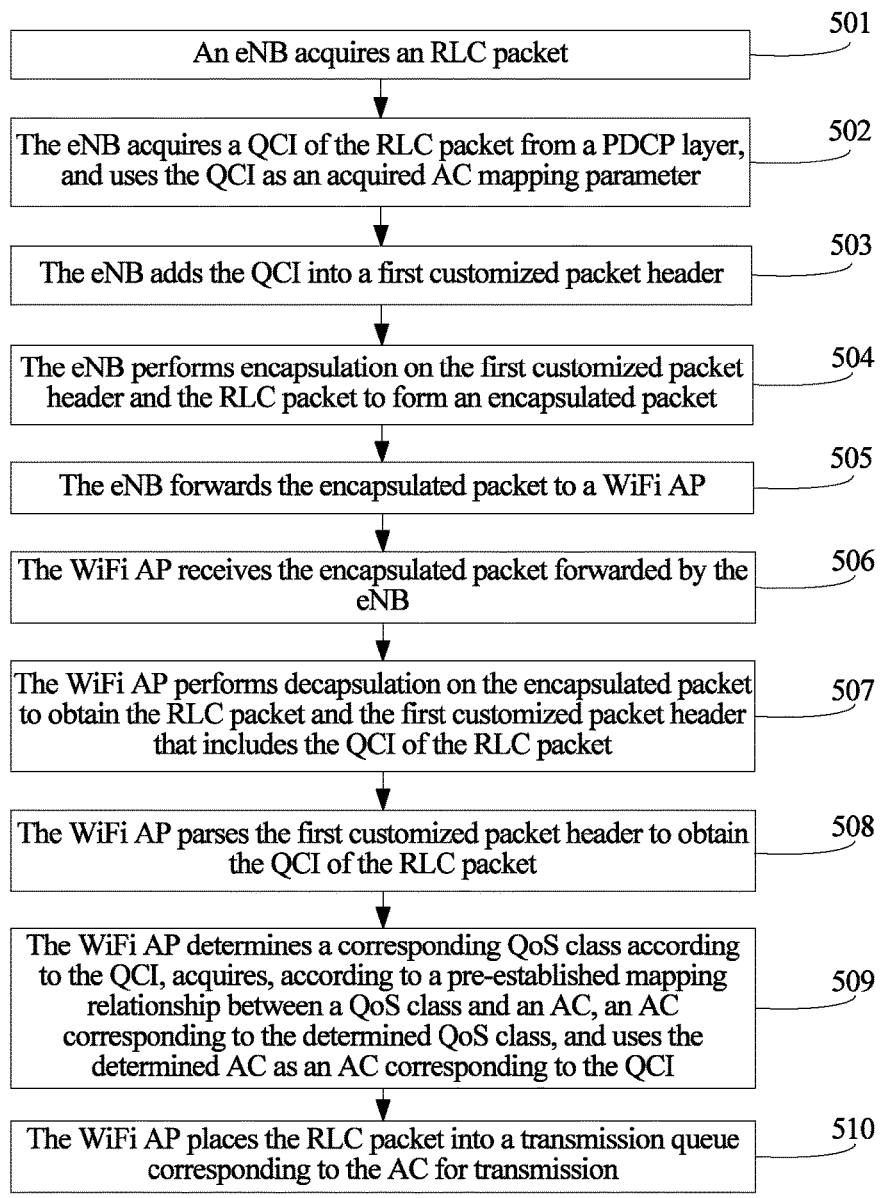
FIG. 5 is a flowchart of a multi-standard network convergence method according to Embodiment 3 of the present invention.

This embodiment provides a multi-standard network convergence method. For ease of description, in this embodiment, the method provided in this embodiment is exemplarily described in detail still by using an example in which a first network is an LTE network, a first network device is an eNB, a second network is a WLAN, a second network device is a WiFi AP, and the eNB acquires an RLC packet and sends the RLC packet to the WiFi AP. Referring to FIG. 5, a procedure of the method provided in this embodiment is specifically as follows:

501. The eNB acquires an RLC packet.

For details of a specific implementation manner of this step, refer to description of step 301 in the foregoing Embodiment 2, and details are not described herein again.

502. The eNB acquires a QCI (QoS Class Identifier, QoS class identifier) of the RLC packet from a PDCP (Packet Data Convergence Protocol, Packet Data Convergence Protocol) layer, and uses the QCI as an acquired AC mapping parameter.

This embodiment imposes no specific limitation on a manner for acquiring the QCI of the RLC packet from the PDCP layer, which includes but is not limited to performing decapsulation on the RLC packet to obtain the QCI of the RLC packet by means of decoding.

In addition, because the QCI may reflect a QoS class carried in the packet, and the QoS class has a mapping relationship with an AC, the AC may be learned according to the QCI. Therefore, the QCI is used as the acquired AC mapping parameter.

Specifically, the eNB performs decapsulation on the RLC packet at the PDCP layer to acquire the QCI of the RLC packet by means of decoding; or certainly, may parse the QCI of the RLC packet at the PDCP layer by using another method, and use the QCI as the acquired AC mapping parameter.

503. The eNB adds the QCI into a first customized packet header.

For this step, the eNB replicates the QCI and adds the replicated QCI into the first customized packet header, and this embodiment imposes no specific limitation on a manner for adding the replicated QCI into the first customized packet header. For example, the replicated QCI and the first customized packet header may be coded, so as to add the replicated QCI into the first customized packet header. This embodiment also imposes no specific limitation on content of the first customized packet header, and the first customized packet header may include but is not limited to a destination address of the RLC packet.

Specifically, the eNB replicates the QCI obtained by means of decapsulation, and codes the replicated QCI and the first customized packet header, so as to add the replicated QCI into the first customized packet header.

504. The eNB performs encapsulation on the first customized packet header and the RLC packet to form an encapsulated packet.

This embodiment imposes no specific limitation on a manner for performing encapsulation on the first customized packet header and the RLC packet, which includes but is not limited to coding the first customized packet header and the RLC packet to form the encapsulated packet.

Specifically, the eNB codes the first customized packet header obtained in step 503 and the acquired RLC packet to form the encapsulated packet, where a format is shown in FIG. 4 (*c*).

505. The eNB forwards the encapsulated packet to the WiFi AP.

For details of a specific implementation manner of this step, refer to description of step 305 in the foregoing Embodiment 2, and details are not described herein again.

506. The WiFi AP receives the encapsulated packet forwarded by the eNB, where the encapsulated packet includes the AC mapping parameter and the RLC packet.

For this step, this embodiment imposes no specific limitation on a manner for receiving the encapsulated packet forwarded by the eNB, for example, encapsulated packets forwarded by the eNB may be received in batches, or all encapsulated packets forwarded by the eNB may be received at a time.

Specifically, the WiFi AP receives, in batches, the encapsulated packets forwarded by the eNB, or the WiFi AP receives, at a time, all the encapsulated packets forwarded by the eNB, where a format of the encapsulated packets is shown in FIG. 4 (c).

507. The WiFi AP performs decapsulation on the encapsulated packet to obtain the RLC packet and the first customized packet header that includes the QCI of the RLC packet.

For this step, this embodiment imposes no specific limitation on a method for performing decapsulation on the encapsulated packet, which includes but is not limited to decoding the encapsulated packet.

Specifically, the WiFi AP decodes the received encapsulated packet to obtain the RLC packet and the first customized packet header that includes the QCI of the RLC packet.

508. The WiFi AP parses the first customized packet header to obtain the QCI of the RLC packet.

For this step, this embodiment imposes no specific limitation on a method for parsing the first customized packet header, which includes but is not limited to decoding the first customized packet header.

Specifically, the WiFi AP decodes the first customized packet header to obtain the QCI of the RLC packet.

509. The WiFi AP determines a corresponding QoS class according to the QCI, acquires, according to a pre-established mapping relationship between a QoS class and an AC, an AC corresponding to the determined QoS class, and uses the determined AC as an AC corresponding to the QCI.

Because the QCI reflects the QoS class carried in the packet, the corresponding QoS class may be determined according to the QCI. This embodiment imposes no specific limitation on a manner for determining the corresponding QoS class according to the QCI, which includes but is not limited to acquiring the corresponding QoS class by using a table of a correspondence between a QCI and a QoS class. Alternatively, the corresponding QoS class may be acquired in another manner.

This embodiment imposes no specific limitation on a method for acquiring the AC corresponding to the determined QoS class, for example, the AC is acquired by using a table of a correspondence between a QoS class and an AC. Alternatively, the AC may be acquired in another manner.

Specifically, the WiFi AP determines the corresponding QoS class according to the obtained QCI, and uses the AC that is corresponding to the QoS class and determined according to a table of a correspondence between a QCI and an AC as the AC corresponding to the QCI.

For example, a table of a correspondence between a QCI, a QoS class, and an AC is shown in Table 2.

TABLE 2

| QCI | QoS class | AC |
|---|---|---|
| 1 | 7 | Voice |
| 2 | 6 | Voice |
| 3 | 5 | Video |
| 4 | 4 | Video |
| 5 | 3 | Best-effort |
| 6 | 0 | Best-effort |
| 7 | 2 | Back-ground |
| 8 | 1 | Back-ground |

Voice (Voice), Video (Video), Best-effort (Best-effort), and Back-ground (Back-ground) in the foregoing Table 2 are specifically ACs. In addition to the foregoing categories, another AC may further be included. This embodiment imposes no limitation on a specific AC. If a value of the QCI that is obtained by the WiFi AP is 4, it is determined, according to a correspondence between a QCI and a QoS class in Table 2, that the QoS class corresponding to the QCI is 4, it is then determined, according to a correspondence between a QoS class and an AC in Table 2, that an AC corresponding to QoS whose class is 6 is Video, and the determined Video is used as the AC corresponding to the QCI. Certainly, a value of the QCI may be 5, 3, or another value, and a value of the QCI is not specifically limited herein.

510. The WiFi AP places the RLC packet into a transmission queue corresponding to the AC for transmission.

Specifically, if it is determined in step 509 that the AC of the RLC packet is Video, the RLC packet is placed into a Video queue corresponding to the AC for transmission. Certainly, if it is determined in step 509 that the AC of the RLC packet is Voice, the RLC packet is placed into a Voice queue corresponding to the AC for transmission. A format of the RLC packet uses the FIG. 4 (a) as an example.

According to the method provided in this embodiment, a QCI used as an AC mapping parameter, and an RLC packet are encapsulated and then sent to a second network, so that the second network may determine a corresponding AC according to the QCI, so as to accurately place the RLC packet into a corresponding transmission queue for transmission and further implement multi-standard network convergence.

Embodiment 4

Figure 6:
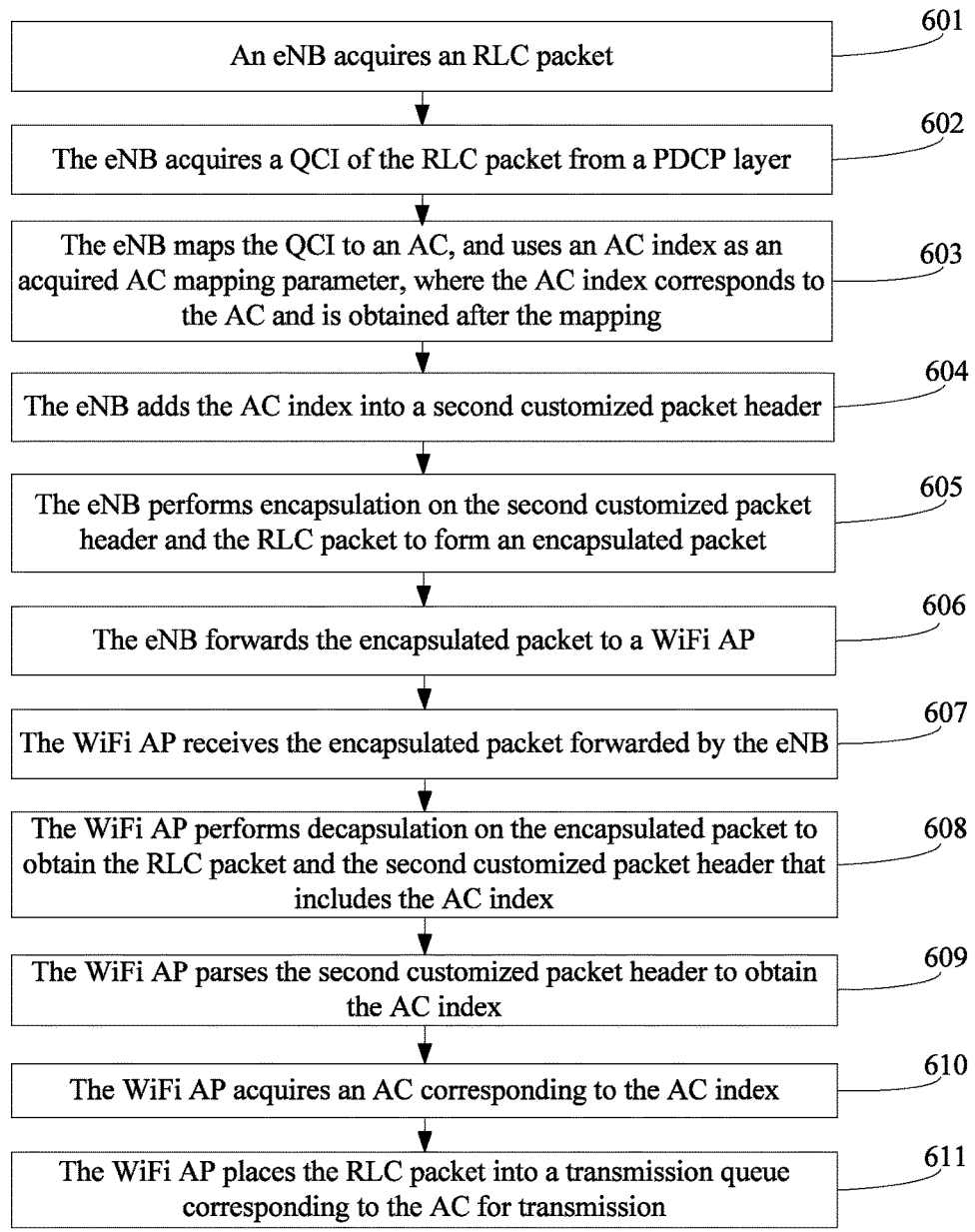
FIG. 6 is a flowchart of a multi-standard network convergence method according to Embodiment 4 of the present invention.

This embodiment provides a multi-standard network convergence method. For ease of description, in this embodiment, the method provided in this embodiment is exemplarily described in detail still by using an example in which a first network is an LTE network, a first network device is an eNB, a second network is a WLAN, a second network device is a WiFi AP, and the eNB acquires an RLC packet and sends the RLC packet to the WiFi AP. Referring to FIG. 6, a procedure of the method provided in this embodiment is specifically as follows:

601. The eNB acquires an RLC packet.

For details of a specific implementation manner of this step, refer to description of step 301 in the foregoing Embodiment 2, and details are not described herein again.

602. The eNB acquires a QCI of the RLC packet from a PDCP layer.

This embodiment imposes no specific limitation on a manner for acquiring the QCI of the RLC packet from the PDCP layer, which includes but is not limited to performing decapsulation on the RLC packet to obtain the QCI of the RLC packet by means of decoding.

Specifically, the eNB performs decapsulation on the RLC packet at the PDCP layer to acquire the QCI of the RLC packet by means of decoding; or certainly, may parse the QCI of the RLC packet at the PDCP layer by using another method.

603. The eNB maps the QCI to an AC, and uses an AC index as an acquired AC mapping parameter, where the AC index corresponds to the AC and is obtained after the mapping.

For this step, this embodiment imposes no specific limitation on a method for mapping the QCI to the AC. The QCI may be mapped to the AC according to a table of a correspondence between a QCI and an AC. This embodiment also imposes no specific limitation on a method for obtaining the AC index according to the AC. The AC index may be obtained according to a table of a correspondence between an AC and an AC index.

For example, a table of a correspondence between a QCI, an AC, and an AC index is shown in Table 3.

TABLE 3

| QCI | AC | AC index |
|-----|------------|----------|
| 1 | Voice | 00 |
| 2 | Voice | 00 |
| 3 | Video | 01 |
| 4 | Video | 01 |
| 5 | Best-effort | 10 |
| 6 | Best-effort | 10 |
| 7 | Back-ground | 11 |
| 8 | Back-ground | 11 |

Voice (Voice), Video (Video), Best-effort (Best-effort), and Back-ground (Back-ground) in the foregoing Table 3 are specifically ACs. In addition to the foregoing categories, another AC may further be included. This embodiment imposes no limitation on a specific AC. If the obtained QCI of the packet is 4, the QCI is mapped to the AC according to Table 3 to obtain that the AC is Video, an AC index that corresponds to the AC and is obtained after the mapping is 01, and 01 is used as the acquired AC mapping parameter. Certainly, a value of the QCI may be 3, 5, or another value, which is not specifically limited herein.

In addition, because the AC index may reflect a WLAN QoS class corresponding to the packet, and the WLAN QoS class has a mapping relationship with an AC, the AC may be learned according to the AC index. Therefore, the AC index is used as the acquired AC mapping parameter.

604. The eNB adds the AC index into a second customized packet header.

For this step, this embodiment imposes no specific limitation on a manner for adding the AC index into the second customized packet header, for example, the AC index and the second customized packet header may be coded, so as to add the AC index into the second customized packet header. This embodiment also imposes no specific limitation on content of the second customized packet header, and the second customized packet header may include but is not limited to a destination address of the RLC packet.

Specifically, the eNB replicates the obtained AC index, and codes the AC index and the second customized packet header, so as to add the AC index into the second customized packet header.

605. The eNB performs encapsulation on the second customized packet header and the RLC packet to form an encapsulated packet.

This embodiment imposes no specific limitation on a manner for performing encapsulation on the second customized packet header and the RLC packet, which includes but is not limited to coding the second customized packet header and the RLC packet to form the encapsulated packet.

Specifically, the eNB codes the second customized packet header obtained in step 604 and the acquired RLC packet to form the encapsulated packet, where a format is shown in FIG. 4 (c).

606. The eNB forwards the encapsulated packet to the WiFi AP.

For details of a specific implementation manner of this step, refer to description of step 305 in the foregoing Embodiment 2, and details are not described herein again.

607. The WiFi AP receives the encapsulated packet forwarded by the eNB, where the encapsulated packet includes the AC mapping parameter and the RLC packet.

For this step, this embodiment imposes no specific limitation on a manner for receiving the encapsulated packet forwarded by the eNB, for example, encapsulated packets forwarded by the eNB may be received in batches, or all encapsulated packets forwarded by the eNB may be received at a time.

Specifically, the WiFi AP receives, in batches, the encapsulated packets forwarded by the eNB, or the WiFi AP receives, at a time, all the encapsulated packets forwarded by the eNB, where a format of the encapsulated packets is shown in FIG. 4 (c).

608. The WiFi AP performs decapsulation on the encapsulated packet to obtain the RLC packet and the second customized packet header that includes the AC index.

For this step, this embodiment imposes no specific limitation on a method for performing decapsulation on the encapsulated packet, which includes but is not limited to decoding the encapsulated packet.

Specifically, the WiFi AP decodes the received encapsulated packet to obtain the RLC packet and the second customized packet header that includes the AC index.

609. The WiFi AP parses the second customized packet header to obtain the AC index.

For this step, this embodiment imposes no specific limitation on a method for parsing the second customized packet header, which includes but is not limited to decoding the second customized packet header.

Specifically, the WiFi AP decodes the second customized packet header to obtain the AC index.

610. The WiFi AP acquires an AC corresponding to the AC index.

This embodiment imposes no specific limitation on a method for acquiring the AC corresponding to the AC index, for example, the AC corresponding to the AC index is acquired by using a table of a correspondence between an AC index and an AC. Alternatively, the AC may be acquired in another manner.

Specifically, the WiFi AP determines the corresponding AC according to the obtained AC index.

For example, the table of the correspondence between an AC index and an AC is shown in Table 4.

TABLE 4

| AC index | AC |
|----------|-------------|
| 00 | Voice |
| 00 | Voice |
| 01 | Video |
| 01 | Video |
| 10 | Best-effort |
| 10 | Best-effort |
| 11 | Back-ground |
| 11 | Back-ground |

Voice (Voice), Video (Video), Best-effort (Best-effort), and Back-ground (Back-ground) in the foregoing Table 4 are specifically ACs. In addition to the foregoing categories, another AC may further be included. This embodiment imposes no limitation on a specific AC. If the AC index obtained by the WiFi AP is 01, it is obtained, according to the correspondence between an AC index and an AC in Table 4, that an AC corresponding to the AC index is Video. Certainly, a value of the AC index may be 00, 10, or another value, and a value of the AC index is not specifically limited herein.

611. The WiFi AP places the RLC packet into a transmission queue corresponding to the AC for transmission.

Specifically, if it is determined in step 610 that the AC of the RLC packet is Video, the RLC packet is placed into a Video queue corresponding to the AC for transmission. Certainly, if it is determined in step 610 that the AC of the RLC packet is Voice, the RLC packet is placed into a Voice queue corresponding to the AC for transmission. A format of the RLC packet uses the FIG. 4 (*a*) as an example.

According to the method provided in this embodiment, an AC index used as an AC mapping parameter, and an RLC packet are encapsulated and then sent to a second network, so that the second network may determine a corresponding AC according to the AC index, so as to accurately place the RLC packet into a corresponding transmission queue for transmission and further implement multi-standard network convergence.

Embodiment 5

Figure 7:
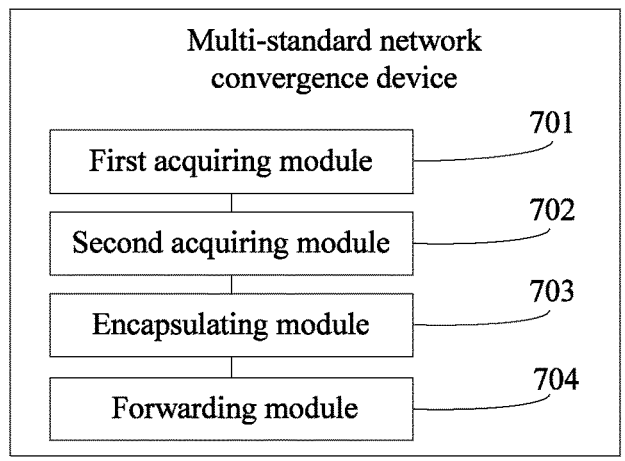
FIG. 7 is a schematic structural diagram of a multi-standard network convergence device according to Embodiment 5 of the present invention.

This embodiment provides a multi-standard network convergence device. The device is configured to execute functions executed by a first network device in the foregoing methods, provided in Embodiment 1 to Embodiment 4, for implementing multi-standard network convergence. Referring to FIG. 7, the device includes:

a first acquiring module 701, configured to acquire an RLC packet;

a second acquiring module 702, configured to acquire an AC mapping parameter corresponding to the RLC packet acquired by the first acquiring module 701;

an encapsulating module 703, configured to perform encapsulation on the AC mapping parameter acquired by the second acquiring module 702 and the RLC packet acquired by the first acquiring module 701, to form an encapsulated packet; and a forwarding module 704, configured to: forward the encapsulated packet obtained by the encapsulating module 703 to a second network, so that the second network acquires a corresponding AC according to the AC mapping parameter in the encapsulated packet, and places the RLC packet into a transmission queue corresponding to the AC for transmission.

Further, the second acquiring module 702 is further configured to: parse a DSCP of the RLC packet by using a DPI technology, and use the DSCP as the acquired AC mapping parameter; and the encapsulating module 703 is further configured to: replicate the DSCP acquired by the second acquiring module 702 to an IP tunnel header, and perform encapsulation on the IP tunnel header and the RLC packet to form the encapsulated packet, where the IP tunnel header further includes an IP source address and an IP destination address of the RLC packet.

Optionally, the second acquiring module 702 is further configured to: acquire a QCI of the RLC packet from a PDCP layer, and use the QCI as the acquired AC mapping parameter; and the encapsulating module 703 is further configured to: add the QCI acquired by the second acquiring module 702 into a first customized packet header, and perform encapsulation on the first customized packet header and the RLC packet to form the encapsulated packet.

Optionally, the second acquiring module 702 is further configured to: acquire a QoS class identifier QCI of the RLC packet from a PDCP layer, map the QCI to an AC, and use an AC index as the acquired AC mapping parameter, where the AC index corresponds to the AC and is obtained after the mapping; and the encapsulating module 703 is further configured to: add the AC index acquired by the second acquiring module 702 into a second customized packet header, and perform encapsulation on the second customized packet header and the RLC packet to form the encapsulated packet.

According to the device provided in this embodiment, an AC mapping parameter and an RLC packet are encapsulated and then sent to a second network, so that the second network may determine a corresponding AC according to the AC mapping parameter, so as to accurately place the RLC packet into a corresponding transmission queue for transmission and further implement multi-standard network convergence.

Embodiment 6

Figure 8:
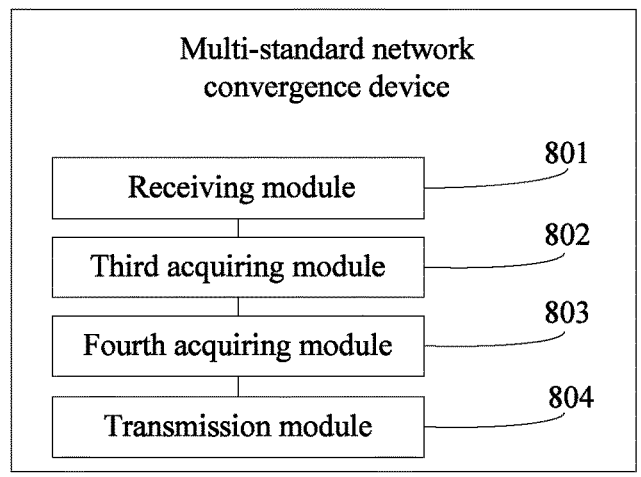
FIG. 8 is a schematic structural diagram of a multi-standard network convergence device according to Embodiment 6 of the present invention.

This embodiment provides a multi-standard network convergence device. The device is configured to execute functions executed by a second network device in the foregoing methods, provided in Embodiment 1 to Embodiment 4, for implementing multi-standard network convergence. Referring to FIG. 8, the device includes:

a receiving module 801, configured to receive an encapsulated packet forwarded by a first network, where the encapsulated packet includes an AC mapping parameter and an RLC packet;

a third acquiring module 802, configured to acquire the AC mapping parameter in the encapsulated packet received by the receiving module 801;

a fourth acquiring module 803, configured to acquire an AC corresponding to the AC mapping parameter acquired by the third acquiring module 802; and a transmission module 804, configured to place the RLC packet into a transmission queue corresponding to the AC for transmission, where the AC is acquired by the fourth acquiring module 803.

Further, the AC mapping parameter corresponding to the RLC packet is a DSCP of the RLC packet;

the third acquiring module 802 is further configured to: perform decapsulation on the encapsulated packet to obtain the RLC packet and an IP tunnel header that includes the DSCP of the RLC packet, and parse the IP tunnel header to obtain the DSCP of the RLC packet; and the fourth acquiring module 803 is further configured to: determine a corresponding QoS class according to the DSCP, acquire, according to a pre-established mapping relationship between a QoS class and an AC, an AC corresponding to the determined QoS class, and use the determined AC as an AC corresponding to the DSCP.

Optionally, the AC mapping parameter corresponding to the RLC packet is a QCI of the RLC packet;

the third acquiring module 802 is configured to: perform decapsulation on the encapsulated packet to obtain the RLC packet and a first customized packet header that includes the QCI of the RLC packet, and parse the first customized packet header to obtain the QCI of the RLC packet; and the fourth acquiring module 803 is configured to: determine a corresponding QoS class according to the QCI, acquire, according to a pre-established mapping relationship between a QoS class and an AC, an AC corresponding to the determined QoS class, and use the determined AC as an AC corresponding to the QCI.

Optionally, the AC mapping parameter corresponding to the RLC packet is an AC index;

the third acquiring module 802 is configured to: perform decapsulation on the encapsulated packet to obtain the RLC packet and a second customized packet header that includes the AC index, and parse the second customized packet header to obtain the AC index; and the fourth acquiring module 803 is configured to acquire an AC corresponding to the AC index.

According to the device provided in this embodiment, an encapsulated packet that is sent by a first network and includes an AC mapping parameter and an RLC packet is received, and a corresponding AC is determined according to the AC mapping parameter in the encapsulated packet, so as to accurately place the RLC packet into a corresponding transmission queue for transmission and further implement multi-standard network convergence.

Embodiment 7

Figure 9:
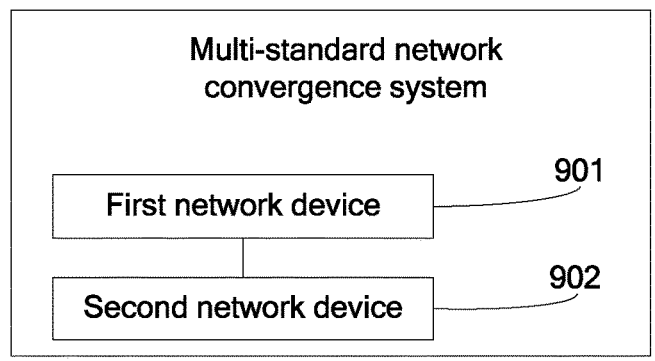
FIG. 9 is a schematic structural diagram of a multi-standard network convergence system according to Embodiment 7 of the present invention.

This embodiment provides a multi-standard network convergence system. The system is configured to execute the foregoing multi-standard network convergence methods provided in Embodiment 1 to Embodiment 4. Referring to FIG. 9, the system includes:

a first network device 901 and a second network device 902.

The first network device 901 is the network device provided in the foregoing Embodiment 5, and for details, refer to the foregoing Embodiment 5; and the second network device 902 is the network device provided in the foregoing Embodiment 6, and for details, refer to the foregoing Embodiment 6.

According to the system provided in this embodiment, a first network device encapsulates an AC mapping parameter and an RLC packet and then sends them to a second network device, so that the second network device may determine a corresponding AC according to the AC mapping parameter, so as to accurately place the RLC packet into a corresponding transmission queue for transmission and further implement multi-standard network convergence.

Embodiment 8

This embodiment provides a multi-standard network convergence device, where the device includes a processor.

The processor is configured to: acquire an RLC packet, and acquire an AC mapping parameter corresponding to the RLC packet; perform encapsulation on the AC mapping parameter and the RLC packet to form an encapsulated packet; and forward the encapsulated packet to a second network, so that the second network acquires a corresponding AC according to the AC mapping parameter in the encapsulated packet, and places the RLC packet into a transmission queue corresponding to the AC for transmission.

Further, the processor is further configured to: parse a DSCP of the RLC packet by using a DPI technology, and use the DSCP as the acquired AC mapping parameter; and replicate the DSCP to an IP tunnel header, and perform encapsulation on the IP tunnel header and the RLC packet to form the encapsulated packet, where the IP tunnel header further includes an IP source address and an IP destination address of the RLC packet.

Optionally, the processor is further configured to: acquire a QCI of the RLC packet from a PDCP layer, and use the QCI as the acquired AC mapping parameter; and add the QCI into a first customized packet header, and perform encapsulation on the first customized packet header and the RLC packet to form the encapsulated packet.

Optionally, the processor is further configured to: acquire a QCI of the RLC packet from a PDCP layer, map the QCI to an AC, and use an AC index as the acquired AC mapping parameter, where the AC index corresponds to the AC and is obtained after the mapping; and add the AC index into a second customized packet header, and perform encapsulation on the second customized packet header and the RLC packet to form the encapsulated packet.

In conclusion, according to the device provided in this embodiment, an AC mapping parameter and an RLC packet are encapsulated and then sent to a second network, so that the second network may determine a corresponding AC according to the AC mapping parameter, so as to accurately place the RLC packet into a corresponding transmission queue for transmission and further implement multi-standard network convergence.

Embodiment 9

This embodiment provides a multi-standard network convergence device, where the device includes a processor.

The processor is configured to: receive an encapsulated packet forwarded by a first network, where the encapsulated packet includes an AC mapping parameter and an RLC packet; acquire the AC mapping parameter in the encapsulated packet, and acquire an AC corresponding to the AC mapping parameter; and place the RLC packet into a transmission queue corresponding to the AC for transmission.

Further, the AC mapping parameter corresponding to the RLC packet is a DSCP of the RLC packet. The processor is further configured to: perform decapsulation on the encapsulated packet to obtain the RLC packet and an IP tunnel header that includes the DSCP of the RLC packet; parse the IP tunnel header to obtain the DSCP of the RLC packet; and determine a corresponding QoS class according to the DSCP, acquire, according to a pre-established mapping relationship between a QoS class and an AC, an AC corresponding to the determined QoS class, and use the determined AC as an AC corresponding to the DSCP.

Further, the AC mapping parameter corresponding to the RLC packet is a QCI of the RLC packet. The processor is further configured to: perform decapsulation on the encapsulated packet to obtain the RLC packet and a first customized packet header that includes the QCI of the RLC packet; parse the first customized packet header to obtain the QCI of the RLC packet; and determine a corresponding QoS class according to the QCI, acquire, according to a pre-established mapping relationship between a QoS class and an AC, an AC corresponding to the determined QoS class, and use the determined AC as an AC corresponding to the QCI.

Further, the AC mapping parameter corresponding to the RLC packet is an AC index. The processor is further configured to: perform decapsulation on the encapsulated packet to obtain the RLC packet and a second customized packet header that includes the AC index; parse the second customized packet header to obtain the AC index; and acquire an AC corresponding to the AC index.

In conclusion, according to the device provided in this embodiment, an encapsulated packet that is sent by a first network and includes an AC mapping parameter and an RLC packet is received, and a corresponding AC is determined according to the AC mapping parameter, so as to accurately place the RLC packet into a corresponding transmission queue for transmission and further implement multi-standard network convergence.

It should be noted that, the division of the foregoing function modules is merely used as an example for description when the multi-standard network convergence devices provided in the foregoing embodiments implement multi-standard network convergence. In an actual application, the foregoing functions may be allocated to different function modules to complete according to requirements, that is, internal structures of the devices are divided into different function modules for completing all or some functions described above. In addition, the multi-standard network convergence devices provided in the foregoing embodiments pertain to the same concept as the embodiments of the methods for implementing multi-standard network convergence; and reference may be made to the method embodiments for specific implementation thereof, and details are not described herein again.

The sequence numbers of the foregoing embodiments of the present invention are merely for illustrative purposes, but are not intended to indicate priorities of the embodiments.

A person of ordinary skill in the art may understand that all or some of the steps of the foregoing embodiments may be implemented by hardware or a program instructing related hardware. The program may be stored in a computer-readable storage medium. The foregoing storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A multi-standard network convergence method comprising:
    acquiring a Radio Link Control (RLC) packet, and acquiring an access category (AC) mapping parameter corresponding to the RLC packet according to data in the RLC packet indicating a quality of service;
    performing encapsulation on the AC mapping parameter and the RLC packet to form an encapsulated packet; and
    forwarding the encapsulated packet to a second network, so that the second network acquires a corresponding AC according to the AC mapping parameter in the encapsulated packet, and places the RLC packet into a transmission queue corresponding to the AC for transmission.

2. The method according to claim 1, wherein the acquiring the AC mapping parameter corresponding to the RLC packet comprises:
    parsing a differentiated services code point (DSCP) of the RLC packet by using a deep packet inspection (DPI) technology, and using the DSCP as the acquired AC mapping parameter; and
    wherein the performing encapsulation on the AC mapping parameter and the RLC packet to form an encapsulated packet comprises:
        replicating the DSCP to an Internet Protocol (IP) tunnel header, and performing encapsulation on the IP tunnel header and the RLC packet to form the encapsulated packet; and
    wherein the IP tunnel header further comprises an IP source address and an IP destination address of the RLC packet.

3. The method according to claim 1, wherein the acquiring an AC mapping parameter corresponding to the RLC packet comprises:
    acquiring a quality of service (QoS) class identifier (QCI) of the RLC packet from a Packet Data Convergence Protocol (PDCP) layer, and using the QCI as the acquired AC mapping parameter; and
    the performing encapsulation on the AC mapping parameter and the RLC packet to form an encapsulated packet comprises:
        adding the QCI into a first customized packet header, and performing encapsulation on the first customized packet header and the RLC packet to form the encapsulated packet.

4. The method according to claim 1, wherein the acquiring an access category AC mapping parameter corresponding to the RLC packet comprises:
    acquiring a quality of service (QoS) class identifier (QCI) of the RLC packet from a Packet Data Convergence Protocol (PDCP) layer;
    mapping the QCI to an AC, and
    using an AC index as the acquired AC mapping parameter, wherein the AC index corresponds to the AC and is obtained after the mapping; and
    wherein the performing encapsulation on the AC mapping parameter and the RLC packet to form an encapsulated packet comprises:
        adding the AC index into a second customized packet header; and
        performing encapsulation on the second customized packet header and the RLC packet to form the encapsulated packet.

5. A network device comprising a processor and a non-transitory computer-readable medium storing program modules executable by the processor, the modules comprising:
    a first acquiring module, configured to acquire a Radio Link Control (RLC) packet;
    a second acquiring module, configured to acquire an access category (AC) mapping parameter corresponding to the RLC packet acquired by the first acquiring module, the second acquiring module further configured to acquire the mapping parameter according to data in the RLC packet indicating a quality of service;
    an encapsulating module, configured to perform encapsulation on the AC mapping parameter acquired by the second acquiring module and the RLC packet acquired by the first acquiring module, to form an encapsulated packet; and
    a forwarding module, configured to forward the encapsulated packet obtained by the encapsulating module to a second network, so that the second network acquires a corresponding AC according to the AC mapping parameter in the encapsulated packet, and places the RLC packet into a transmission queue corresponding to the AC for transmission.

6. The device according to claim 5, wherein the second acquiring module is configured to parse a differentiated services code point (DSCP) of the RLC packet by using a deep packet inspection, DPI, technology, and using the DSCP as the acquired AC mapping parameter;
    wherein the encapsulating module is configured to: replicate the DSCP acquired by the second acquiring module to an Internet Protocol (IP) tunnel header, and perform encapsulation on the IP tunnel header and the RLC packet to form the encapsulated packet; and wherein the IP tunnel header further comprises an IP source address and an IP destination address of the RLC packet.

7. The device according to claim 5, wherein the second acquiring module is configured to acquire a quality of service (QoS) class identifier (QCI) of the RLC packet from a Packet Data Convergence Protocol (PDCP) layer, and use the QCI as the acquired AC mapping parameter; and wherein the encapsulating module is configured to add the QCI acquired by the second acquiring module into a first customized packet header, and perform encapsulation on the first customized packet header and the RLC packet to form the encapsulated packet.

8. The device according to claim 5, wherein the second acquiring module is configured to acquire a quality of service (QoS) class identifier (QCI) of the RLC packet from a Packet Data Convergence Protocol (PDCP) layer, map the QCI to an AC, and use an AC index as the acquired AC mapping parameter, wherein the AC index corresponds to the AC and is obtained after the mapping; and wherein the encapsulating module is configured to add the AC index acquired by the second acquiring module into a second customized packet header and perform encapsulation on the second customized packet header and the RLC packet to form the encapsulated packet.

9. A multi-standard network convergence method comprising:

receiving an encapsulated packet forwarded by a first network, wherein the encapsulated packet comprises an access category (AC) mapping parameter and a Radio Link Control (RLC) packet, the AC mapping parameter associated with a quality of service indicated by data in the RLC packet;

acquiring the AC mapping parameter in the encapsulated packet, and acquiring an AC corresponding to the AC mapping parameter; and placing the RLC packet into a transmission queue corresponding to the AC for transmission.

10. The method according to claim 9, wherein the AC mapping parameter corresponding to the RLC packet is a differentiated services code point (DSCP) of the RLC packet;

wherein the acquiring the AC mapping parameter in the encapsulated packet comprises:

performing decapsulation on the encapsulated packet to obtain the RLC packet and an Internet Protocol (IP) tunnel header that comprises the DSCP of the RLC packet; and parsing the IP tunnel header to obtain the DSCP of the RLC packet; and wherein the acquiring an AC corresponding to the AC mapping parameter comprises:

determining a corresponding quality of service (QoS) class according to the DSCP;

acquiring, according to a pre-established mapping relationship between a QoS class and an AC, an AC corresponding to the determined QoS class; and using the determined AC as an AC corresponding to the DSCP.

11. The method according to claim 9, wherein the AC mapping parameter corresponding to the RLC packet is a quality of service (QoS) class identifier (QCI) of the RLC packet;

wherein the acquiring the AC mapping parameter in the encapsulated packet comprises:

performing decapsulation on the encapsulated packet to obtain the RLC packet and a first customized packet header that comprises the QCI of the RLC packet; and parsing the first customized packet header to obtain the QCI of the RLC packet; and wherein the acquiring an AC corresponding to the AC mapping parameter comprises:

determining a corresponding QoS class according to the QCI;

acquiring, according to a pre-established mapping relationship between a QoS class and an AC, an AC corresponding to the determined QoS class; and using the determined AC as an AC corresponding to the QCI.

12. The method according to claim 9, wherein the AC mapping parameter corresponding to the RLC packet is an AC index;

wherein the acquiring the AC mapping parameter in the encapsulated packet comprises:

performing decapsulation on the encapsulated packet to obtain the RLC packet and a second customized packet header that comprises the AC index, and parsing the second customized packet header to obtain the AC index; and wherein the acquiring an AC corresponding to the AC mapping parameter comprises acquiring an AC corresponding to the AC index.

13. A network device comprising a processor and a non-transitory computer-readable medium storing program modules executable by the processor, the modules comprising:

a receiving module, configured to receive an encapsulated packet forwarded by a first network, wherein the encapsulated packet comprises an access category (AC), mapping parameter and a Radio Link Control (RLC) packet;

a third acquiring module, configured to acquire the AC mapping parameter in the encapsulated packet received by the receiving module, the third acquiring module further configured to acquire the mapping parameter according to data in the RLC packet indicating a quality of service;

a fourth acquiring module, configured to acquire an AC corresponding to the AC mapping parameter acquired by the third acquiring module; and a transmission module, configured to place the RLC packet into a transmission queue corresponding to the AC for transmission, wherein the AC is acquired by the fourth acquiring module.

14. The device according to claim 13, wherein the AC mapping parameter corresponding to the RLC packet is a differentiated services code point (DSCP) of the RLC packet;

wherein the third acquiring module is configured to:

perform decapsulation on the encapsulated packet to obtain the RLC packet and an Internet Protocol (IP) tunnel header that comprises the DSCP of the RLC packet; and parse the IP tunnel header to obtain the DSCP of the RLC packet; and wherein the fourth acquiring module is configured to:

determine a corresponding quality of service (QoS) class according to the DSCP;

acquire, according to a pre-established mapping relationship between a QoS class and an AC, an AC corresponding to the determined QoS class; and use the determined AC as an AC corresponding to the DSCP.

15. The device according to claim 13, wherein the AC mapping parameter corresponding to the RLC packet is a quality of service (QoS) class identifier (QCI) of the RLC packet;
wherein the third acquiring module is configured to:
perform decapsulation on the encapsulated packet to obtain the RLC packet and a first customized packet header that comprises the QCI of the RLC packet; and
parse the first customized packet header to obtain the QCI of the RLC packet; and
wherein the fourth acquiring module is configured to:
determine a corresponding QoS class according to the QCI;
acquire, according to a pre-established mapping relationship between a QoS class and an AC, an AC corresponding to the determined QoS class; and
use the determined AC as an AC corresponding to the QCI.

16. The device according to claim 13, wherein the AC mapping parameter corresponding to the RLC packet is an AC index;
wherein the third acquiring module is configured to:
perform decapsulation on the encapsulated packet to obtain the RLC packet and a second customized packet header that comprises the AC index; and
parse the second customized packet header to obtain the AC index; and
wherein the fourth acquiring module is configured to acquire an AC corresponding to the AC index.

17. A network device, comprising:
a first acquiring module, configured to acquire a Radio Link Control (RLC) packet;
a second acquiring module, configured to acquire an access category (AC) mapping parameter corresponding to the RLC packet acquired by the first acquiring module, the second acquiring module further configured to acquire the mapping parameter according to data in the RLC packet indicating a quality of service;
an encapsulating module, configured to perform encapsulation on the AC mapping parameter acquired by the second acquiring module and the RLC packet acquired by the first acquiring module, to form an encapsulated packet; and
a forwarding module, configured to forward the encapsulated packet obtained by the encapsulating module to a second network, so that the second network acquires a corresponding AC according to the AC mapping parameter in the encapsulated packet, and places the RLC packet into a transmission queue corresponding to the AC for transmission.

18. A network device, comprising:
a receiving module, configured to receive an encapsulated packet forwarded by a first network, wherein the encapsulated packet comprises an access category (AC), mapping parameter and a Radio Link Control (RLC) packet;
a third acquiring module, configured to acquire the AC mapping parameter in the encapsulated packet received by the receiving module, the third acquiring module further configured to acquire the mapping parameter according to data in the RLC packet indicating a quality of service;
a fourth acquiring module, configured to acquire an AC corresponding to the AC mapping parameter acquired by the third acquiring module; and
a transmission module, configured to place the RLC packet into a transmission queue corresponding to the AC for transmission, wherein the AC is acquired by the fourth acquiring module.

* * * * *